Patented May 19, 1925.

1,538,373

UNITED STATES PATENT OFFICE.

WILHELM BERGDOLT AND LUDWIG HAUCK, OF LEVERKUSEN, NEAR COLOGNE-ON-THE-RHINE, GERMANY, ASSIGNORS TO FARBENFABRIKEN VORM. FRIEDR. BAYER AND CO., OF LEVERKUSEN, NEAR COLOGNE-ON-THE-RHINE, GERMANY.

DISAZO DYESTUFF.

No Drawing.     Application filed May 22, 1924.     Serial No. 715,190.

*To all whom it may concern:*

Be it known that we, WILHELM BERGDOLT and LUDWIG HAUCK, citizens of Germany, residing at Leverkusen, near Cologne-on-the-Rhine, State of Prussia, Germany, have invented new and useful Improvements in a Disazo Dyestuff, of which the following is a specification.

Our invention relates to the manufacture and production of new and valuable azo-dyestuffs which dye cotton directly in violet to blue pure shades fast to light which by an after-treatment with metal salts, e. g. copper sulfate change into bluish-violet to violet-blue shades very fast to light. The new dyes have most probably the following general formula:

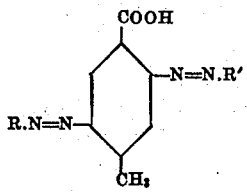

R means a residue of an aromatic amino compound, such as

—$C_6H_2.Cl_2.SO_3H$; —$C_6H_3.OCH_3.SO_3H$,

R' means a residue of an aromatic amino-naphthol compound, such as

—$C_{10}H_4.NH_2.OH.SO_3H$,
—$C_{10}H_4.NH.C_6H_5.OH.SO_3H$.

The process for their production consists in combining a diazocompound of the benzene or naphthalene series with the 4-methyl-2-aminobenzoic acid, further diazotizing and combining with the 2-amino-5-naphthol-7-sulfonic acid compound.

The new dyestuffs are, after being dried and pulverized in the shape of their alkali metal salts, dark brown to black powders soluble in water, generally with from a red to violet coloration and in concentrated sulfuric acid generally with from a blue to reddish-blue coloration. They yield upon reduction with stannous chloride and hydrochloric acid 4-methyl-2.5-diaminobenzoic acid and aromatic amines.

In order to illustrate our new invention more fully the following example is given, the parts being by weight:—

24,2 parts of 2.5-dichloraniline-4-sulfonic acid are diazotized in the usual manner with 6.9 parts of sodium nitrite and 28 parts of hydrochloric acid 19½° Bé. The resulting diazocompound is combined with 15,1 parts of 4-methyl-2-aminobenzoic acid in the presence of sodium acetate. Subsequently the solution is rendered alkaline, 6,9 parts of sodium nitrite are added and further diazotized by adding this solution to hydrochloric acid and ice. The diazocompound thus obtained is then allowed to run into a solution rendered alkaline with sodium carbonate, of 31,5 parts of 2-phenylamino-5-naphthol-7-sulfonic acid. After a short time the combination is complete, the dyestuff is salted out, filtered off and dried.

It is after being dried and pulverized in the shape of its sodium salt a black powder soluble in water with a bordeaux-red coloration and in concentrated sulfuric acid with a blue coloration. It yields upon reduction with stannous chloride and hydrochloric acid 2.5-dichloraniline-4-sulfonic acid, 4-methyl-2.5-diaminobenzoic acid and 2-phenylamino-6-amino-5-naphthol 7-sulfonic acid. It dyes cotton directly in bluish-red shades fast to light, which when after-treated with copper sulfate change into violet-blue shades very fast to light. The new dyestuff has most probably the formula:

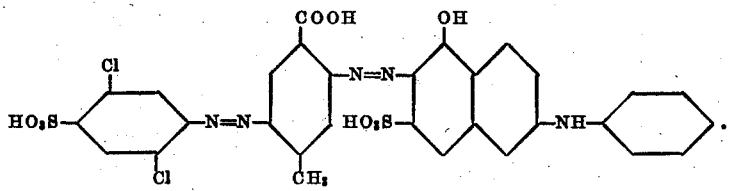

From other components as above mentioned, for instance 2-anisidine-4-sulfonic acid, 4-methyl-2-aminobenzoic acid and 5.5'-dihydroxy-2.2'-dinaphthyl-7.7'-disulfonic acid a bluish-violet dye results, which when after-treated with copper sulfate yields a violet-blue.

We claim:—

1. The herein described new azodyestuffs having most probably the following general formula:

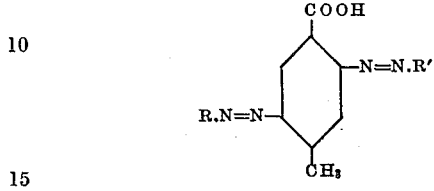

R meaning a residue of an aromatic compound, R' meaning a residue of an aromatic aminonaphthol compound, which are after being dried and pulverized in the shape of their alkali metal salts dark brown to black powders soluble in water with from a red to violet coloration and in concentrated sulfuric acid generally from a blue to reddish-blue coloration; yielding upon reduction with stannous chloride and hydrochloric acid 4-methyl-2.5-diaminobenzoic acid and aromatic amines; dyeing cotton directly generally from violet-red to blue pure clear shades fast to light, which after being after-treated on the fibre with a metal salt change into bluish-violet to violet-blue shades fast to light, substantially as described.

2. The herein described new azodyestuff having most probably the following formula:

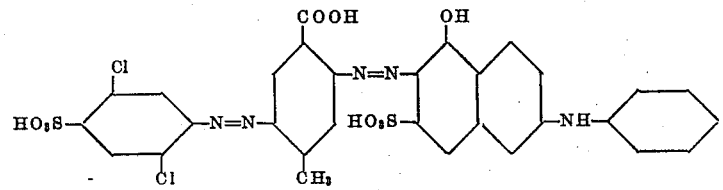

which is after being dried and pulverized in the shape of its sodium salt, a black powder soluble in water with a bordeaux-red coloration and in concentrated sulfuric acid with a blue coloration; yielding upon reduction with stannous chloride and hydrochloric acid 2.5-dichloro-aniline-4-sulfonic acid, 4-methyl-2.5-diaminobenzoic acid and 2-phenylamino-6-amino-5-naphthol-7-sulfonic acid; dyeing cotton bluish-red shades fast to light which by an after-treatment with copper sulfate change into violet-blue shades very fast to light, substantially as described.

In testimony whereof we have hereunto set our hands.

WILHELM BERGDOLT.
LUDWIG HAUCK.